United States Patent
Wang

(10) Patent No.: US 7,265,830 B2
(45) Date of Patent: Sep. 4, 2007

(54) FOURIER TRANSFORM SPECTROMETER APPARATUS USING MULTI-ELEMENT MEMS

(75) Inventor: Sean Xiaolu Wang, Wilmington, DE (US)

(73) Assignee: BWT Property, Inc., Newark, DE (US)

( * ) Notice: Subject to any disclaimer, the term of this patent is extended or adjusted under 35 U.S.C. 154(b) by 55 days.

(21) Appl. No.: 11/064,956

(22) Filed: Feb. 25, 2005

(65) Prior Publication Data

US 2005/0185179 A1    Aug. 25, 2005

Related U.S. Application Data

(60) Provisional application No. 60/547,053, filed on Feb. 25, 2004.

(51) Int. Cl.
*G01J 3/28*    (2006.01)

(52) U.S. Cl. ...................................... 356/328
(58) Field of Classification Search ................ 356/328, 356/319, 334
See application file for complete search history.

(56) References Cited

U.S. PATENT DOCUMENTS

| | | | |
|---|---|---|---|
| 4,799,795 A * | 1/1989 | Fateley | 356/310 |
| 5,504,575 A | 4/1996 | Stafford | |
| 5,570,180 A * | 10/1996 | Nagai | 356/330 |
| 5,828,066 A | 10/1998 | Messerschmidt | |
| 6,031,609 A | 2/2000 | Funk et al. | |
| 6,128,078 A | 10/2000 | Fateley | |
| 6,525,814 B1 * | 2/2003 | Hendrick et al. | 356/328 |
| 6,753,960 B1 | 6/2004 | Polynkin et al. | |
| 6,834,136 B2 | 12/2004 | Solgaard et al. | |
| 6,876,494 B2 * | 4/2005 | Ishikawa et al. | 359/618 |
| 2004/0218177 A1 * | 11/2004 | MacKinnon et al. | 356/326 |
| 2005/0024640 A1 * | 2/2005 | Fateley et al. | 356/330 |
| 2005/0047710 A1 * | 3/2005 | Sinha et al. | 385/18 |
| 2005/0083523 A1 * | 4/2005 | Senturia et al. | 356/323 |

OTHER PUBLICATIONS

O. Solgaard et al., "Deformable grating optical modulator," *Optics Letters*, vol. 17, No. 9, 1992, pp. 688-690.
Asif Godil, "Diffractive MEMS technology offers a new platform for optical networks," http://www.lightconnect.com/technology/Diffractive_MEMS.pdf.
"Metallic High-Reflection Coatings," http://www.mellesgriot.com/pdf/005.25-5.28.pdf.

* cited by examiner

*Primary Examiner*—Gregory J. Toatley, Jr.
*Assistant Examiner*—Kara Geisel
(74) *Attorney, Agent, or Firm*—Blank Rome LLP

(57) ABSTRACT

A Fourier Transform (FT) spectrometer apparatus uses multi-element MEMS (Micro-Electro-Mechanical-Systems) or D-MEMS (Diffractive Micro-Electro-Mechanical-Systems) devices. A polychromatic light source is first diffracted or refracted by a dispersive component such as a grating or prism. The dispersed beam is intersected by a multi-element MEMS apparatus. The MEMS apparatus encodes each spectral component thereof with different time varying modulation through corresponding MEMS element. The light radiation is then spectrally recombined as a single beam. The beam is further split into to a reference beam and a probe beam. The probe light is directed to a sample and then the transmitted or reflected light is collected. Both the reference beam and probe beam are detected by a photo-detector. The detected time varying signal is analyzed by Fourier transformation to resolve the spectral components of the sample under measurement.

29 Claims, 1 Drawing Sheet

FOURIER TRANSFORM SPECTROMETER APPARATUS USING MULTI-ELEMENT MEMS

REFERENCE TO RELATED APPLICATION

The present application claims the benefit of U.S. Provisional Application No. 60/547,053, filed Feb. 25, 2004, whose disclosure is hereby incorporated by reference in its entirety into the present disclosure.

FIELD OF INVENTION

This invention generally relates to apparatus for optical spectroscopic measurement, specifically to a type of Fourier Transform (FT) spectrometer.

BACKGROUND OF THE INVENTION

In a conventional FT (Fourier Transform) optical spectrometer, a Michelson interferometer is used, where a broadband light source is divided into two equal-intensity beams with one of the beams traversing a fixed-distance path and the other traversing a variable-distance path. The beams are then recombined and focused onto a detector. There are some major disadvantages of conventional FT spectrometers, such as the requirement of large dynamic range amplifiers and large-bit A/D boards, the alignment and mechanical reliability problem caused by a moving mirror, and the inability to directly ratio the sample and background signals simultaneously.

Accordingly, it is an object of U.S. Pat. No. 6,031,609, "Fourier transform spectrometer using a multi-element liquid crystal display", disclosed by Funk, et al. to provide an apparatus and method for performing Fourier transform spectroscopy using fixed dispersive optical elements and a polychromatic light source with no bulk optical moving parts. Another object of that reference is to provide a Fourier transform spectrometer having increased S/N ratios over scanning dispersive instruments and gain substantial freedom from 1/f noise. However, Funk's invention is limited due to the transparent wavelength limitation of liquid crystal, especially in the longer wavelength infrared region. In addition, there is a 3 dB loss due to the requirement of polarized light input.

An independent area of endeavor concerns MEMS (micro-electro-mechanical systems) technology. Traditionally, MEMS devices are derivatives of moving mirrors and operate as tiltable reflective surfaces. These are true micro-machines that incorporate actual mechanical components, such as mirrors mounted on some form of a mechanical bearing device. The source light is reflected into different directions as the mirror sweeps across an arc. In many tilting mirror designs, the MEMS device is etched out of a silicon substrate, with the control surface coated with a reflective material such as gold or aluminum, leaving a mirror on a bearing surface. In operation, this type of device will "sweep" light at constant amplitude from the source to the destination aperture, such as an optical fiber or exit pupil. In other words, the light amplitude is constant while the output angle is variable.

The applications of these tiltable mirror or deformable mirror based MEMS devices in the spectrometer field have been disclosed by Stafford in U.S. Pat. No. 5,504,575, "SLM Spectrometer", Messerschmidt in U.S. Pat. No. 5,828,066, "Multisource Infrared Spectrometer", Fateley in U.S. Pat. No. 6,128,078, "Radiation Filter, Spectrometer and Imager Using a Micro-Mirror Array", and Polynkin et al. in U.S. Pat. No. 6,753,960 B1, "Optical Spectral Power Monitors Employing Frequency-Division-Multiplexing Detection Schemes". In the patents by Stafford, Fateley and Polynkin, a MEMS mirror device in combination with a dispersive element is placed between a sample and a photo detector to measure the emission spectrum of the sample. The MEMS mirror functions as either a filter to select certain wavelength component from the emission spectrum or a modulator to encode each wavelength component with different modulation frequency. The drawback of these approaches is that they do not provide a direct way to ratio the spectrum of the sample with the spectrum of the light source, i.e. the background signal, which is very important for absorption or reflection spectrum measurement.

In the patent by Messerschmidt, a deformable MEMS mirror array is employed in combination with a diffraction grating to form a monochrometer to select the desired illumination wavelength from a light source. The MEMS device is placed between the light source and the grating element and functions as an apparatus to spatially modulate the waveform of the light source by varying the curvature of the micro mirror. The performance of this spectroscopic system is not ideal because the waveform modulation provided by the micro mirror is not very accurate. What is more, the disclosed optical system does not provide background signal calibration. None of the patents discussed above teach or suggest the application of the MEMS based spectrometer in the mid or far infrared wavelength region (with wavelength of >2.5 μm).

A different kind of MEMS device, known as diffractive MEMS (D-MEMS), utilizes the wave aspect of light, i.e., interference and diffraction. The basic technology, originally referred to as deformable grating modulators, was pioneered at Stanford University in the early 1990s (O. Solgaard, F. S. A. Sandejas, and D. M. Bloom, "Deformable grating optical modulator," Opt. Lett. 17, 9, pp. 688-690, 1992). The design of D-MEMS devices is unique in that they operate as mirrors in the static state and as a variable grating in the dynamic state. This unique approach offers significant functional advantages in terms of speed, accuracy, reliability and ease of manufacturing over the common "tilting mirror" MEMS structures. The device was further developed with symmetrical structure, and special membrane and island pattern to achieve polarization-independent and achromatic attenuation as described by Asif Godil, et al. in "Diffractive MEMS technology offers a new platform for optical networks," http://www.lightconnect.com/technology/Diffractive_MEMS.pdf. The utilization of diffractive MEMS devices for FT spectrometers has not been disclosed in the previous literature.

SUMMARY OF THE INVENTION

Therefore, it is the goal of the present invention to develop an FT spectrometer that employs a multi-element MEMS or D-MEMS apparatus without limitation of wavelength range, to fully utilize both polarizations of a polychromatic light source for spectroscopic analysis. The spectrometer (a) has no bulk optical moving parts; (b) provides a convenient way to ratio the sample signal and background signal; (c) can work in the longer wavelength infrared regime; and (d) is free of 1/f noise.

The FT spectrometer disclosed in the current invention first uses a dispersive element such as a grating or prism to separate the wavelength components of a polychromatic light source in spatial domain and project them onto different surface areas of a multi-element MEMS or D-MEMS apparatus. A control circuit modulates the position of each micro mirror and encodes different wavelength components of the light source with different time-varying intensity modulations. The intensity modulation may differ in frequency domain, time domain, and phase domain or in code domain. The modulated wavelength components are then recombined and split into two beams. One is used as a probe beam to stimulate absorption or reflection spectrum from a sample. The other is used as a reference beam for background signal calibration. The reference beam and the output beam from the sample are detected using two photo detectors, such as two single element photo detectors. The detected signals are finally demultiplexed according to the multiplexing methods to resolve the spectral components of the sample under measurement.

Another objective of the current invention is to expand the application of the MEMS FT spectrometer to the mid infrared or even far infrared wavelength region, where the vibrational and rotational energy states of the material result in unique absorption or reflection peaks with much narrower linewidth than in the visible or near infrared regime. Previous dispersive spectroscopy technology suffers from the lack of a low cost photo detector array in these wavelength regions, while the conventional FT spectrometer does not have a high enough speed for a real time absorption or reflection spectrum measurement. The MEMS FT spectrometer according to the present invention provides an elegant solution to those problems.

The advance of MEMS (Micro-Electro-Mechanical-Systems) technology has made the current invention possible where a multi-element MEMS apparatus is used as an encoder to provide time-varying intensity modulation for each individual spectral component.

BRIEF DESCRIPTION OF THE DRAWINGS

The accompanying drawings, which are incorporated in and form a part of the specification, illustrate an embodiment of the present invention and, together with the description, serve to explain the principles of the invention.

DETAILED DESCRIPTION OF THE PREFERRED EMBODIMENTS

Figure 1:
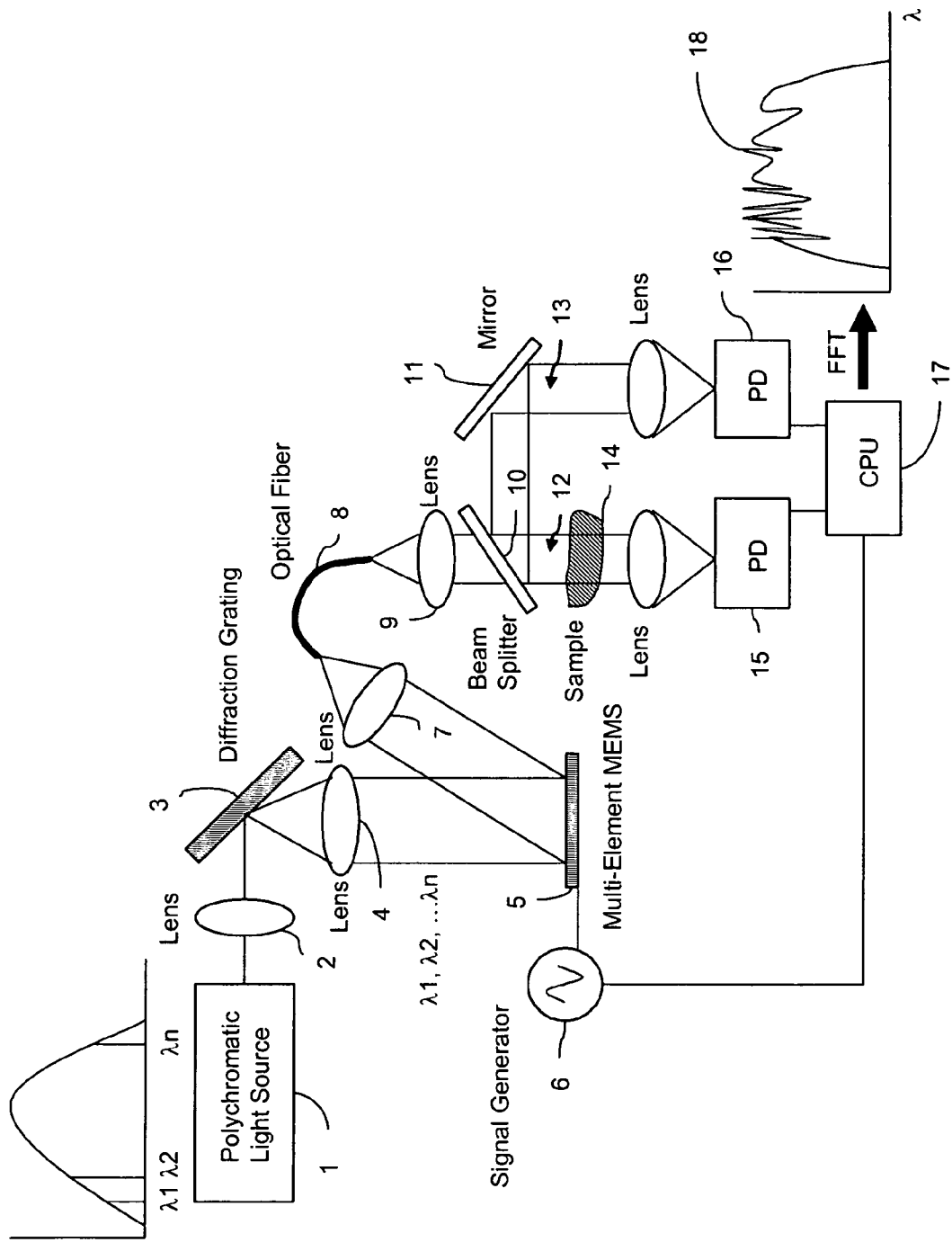
FIG. 1 is a schematic representation of one embodiment of the present invented FT spectrometer.

One embodiment of the invented FT spectrometer apparatus includes: a polychromatic light source such as one/or more broadband SLD (super-luminescent diode), or LED (light emitting diode), lamp or glow bar; an optical element such as a grating or a prism for dispersing the light from the light source into spectral components; a multiple-element MEMS (Micro-Electro-Mechanical-Systems) such as a linear or 2-D tiltable micro-mirror array intercepting the spectrally dispersed light, each element thereof being responsive to an applied voltage, which voltage determines the sweeping angle of that element; a time-varying voltage generator for controlling each element of the tiltable micro-mirror array and encoding each spectral component with a different time-varying dependence of angle rotation; an optical element for recombining the modulated and dispersed light into a single light beam and coupling the encoded light into an optical fiber, or an aperture, therefore generating a time-varying intensity for each spectral component that coupled into the optical fiber or optical aperture; a beam splitter for dividing the encoded light into a probe light beam and a reference light beam, the probe light beam thereof shining on a sample and exiting the sample after transmission, reflection, trans-reflection, or scattering; photo detectors for detecting the reference light beam and the light beam that exits from the sample; and a processor for communicating with the signal generator and performing demultiplexing of the detected light exiting from the sample and the reference light beam, whereby a spectrum of the sample is obtained, such demultiplexing method can be in the form of a Fourier transformation.

A schematic view of this embodiment is illustrated in FIG. 1. As shown in the figure, the embodiment includes (a) a polychromatic light source 1; (b) a lens 2 for collimating the light beam from the light source 1; (c) a diffraction grating 3 (or other suitable dispersive element) for diffracting the light beam into spatially separated spectral components, $\lambda 1, \lambda 2, \ldots \lambda n$; (d) a lens 4 for collecting the diffracted spectral components; (e) a multi-element MEMS 5, such as a tiltable micro-mirror array, for intercepting the dispersed radiation and encoding each spectral component with a different time-varying dependence of angle rotation, such time-varying angle-rotation differing in the frequency domain for each micro-mirror element; (f) a signal generator 6 to generate a time-varying voltage for each element of the tiltable micro-mirror array; (g) a lens 7 for recombining the modulated and dispersed light into a single light beam; (h) coupling the encoded light into an optical fiber 8, therefore generating a time-varying intensity for each spectral component that coupled into the optical fiber; (i) a collimating lens 9, a beam splitter 10 and a mirror 11 for dividing the encoded light into a probe light beam 12 and a reference light beam 13; (j) a sample 14 put under the probe light beam for permitting light to exit the sample after passing through; (k) detecting the reference light beam and the light beam that exits from the sample using two single-element photo detectors 15, 16; (l) performing a Fourier transform on the detected light signals using a microprocessor 17, whereby a spectrum 18 of the sample 14 is obtained.

The embodiment just described operates in the following manner. The polychromatic light source 1 emits a light beam having the spectrum shown in the figure. The light beam is made incident on the diffraction grating (or other dispersive element) 3, which diffracts the light beam so that the spectral components making up the spectrum are spatially separated. The light beam with its spectral components thus separated is made incident on the multi-element MEMS 5.

Because of the spatial separation of the spectral components, each spectral component is made incident on a different element or set of elements of the MEMS 5. Under control of the signal generator 6, the elements of the MEMS 5 are actuated to encode each of the spatially separated spectral components with a different modulation pattern. The encoding can involve modulation of one or more of the intensity, the phase, and the polarization of the spectral components. Because of the spatial separation, the various modulation patterns can be independent and can differ in one or more of the frequency, time, phase, and code domains.

The spectral components, thus encoded, are recombined by the lens 7 into a single encoded light beam, which is coupled into the optical fiber 8. The single encoded light beam is divided into a probe light beam 12 and a reference light beam 13. The probe light beam 12 is caused to pass through the sample 14 to be analyzed; in other embodiments, the probe light beam 12 could be reflected from the sample 14.

Thus, the probe light beam 12 contains information from which a spectroscopic analysis of the sample 14 can be obtained. The manner in which that analysis is obtained will now be described.

The probe light beam 12 is detected by a first photo detector 15. The reference light beam 13 is detected by a second photo detector 16. The first and second photo detectors 15, 16 can be single-element photo detectors.

The outputs of the photo detectors 15, 16 are received by the processor 17, which can analyze the outputs in any suitable manner. Because the processor 17 receives both probe and reference signals, it can ratio the two signals for background calibration, so that the results can be corrected to take into account the spectrum of the light emitted from the light source 1. Also, the encoding of the spectral components allows demultiplexing of the spectral components, since the signal generator 6 operates under the control of the processor 17. The spectral components, thus demultiplexed, can be analyzed by a variety of techniques, such as a Fourier transform, synchronization and timing, heterodyne conversion, and cross correlation. Those techniques in general are known in the art and will therefore not be described in detail here; however, their use in the context of the present invention is considered to be novel.

Another embodiment of the invented FT spectrometer apparatus includes: a polychromatic light source such as one/or more broadband SLD (super-luminescent diode), or LED (light emitting diode), lamp or glow bar; an optical element such as a grating or a prism for dispersing the light from the light source into spectral components; a multiple-element D-MEMS (Diffractive-Micro-Electro-Mechanical-Systems) in the form of either 1-D or 2-D array intercepting the spectrally dispersed light, each element being responsive to an applied voltage which voltage determines the amount of light that element can diffract off the optical axis, therefore generating a dynamic attenuation on the incoming beam; a time-varying voltage generator for controlling each element of the D-MEMS array and encoding each spectral component with a different time-varying dependence of attenuation (or intensity modulation) for that spectral component; an optical element for recombining the modulated and dispersed light into a single light beam and coupling the encoded light into an optical fiber, or an aperture, therefore generating a time-varying intensity for each spectral component that coupled into the optical fiber or optical aperture; a beam splitter for dividing the encoded light into a probe light beam and a reference light beam, the probe light beam thereof shining on a sample and exiting the sample after transmission or reflection; photo detectors for detecting the reference light beam and the light beam exiting from the sample; and a processor for communicating with the signal generator and performing demultiplexing of the detected light exiting from the sample and the reference light beam, whereby a spectrum of the sample is obtained, such demultiplexing method can be in the form of a Fourier transformation.

In another embodiment of the current invention, the MEMS FT spectrometer is applied to the mid infrared or even far infrared wavelength region to measure the absorption or reflection spectrum of a sample, such as a gas sample. In this embodiment, the structure of the MEMS device has to be modified to cater to the long wavelength requirements. For example, the coating material of the MEMS mirror may be changed from aluminum to silver or gold or other materials to maintain a high reflection ratio at the long wavelength region ["Metallic High-Reflection Coatings," http://www.mellesgriot.com/pdf/005.25-5.28.pdf]. The size of the micro-mirror has to be increased to avoid significant diffraction problem. However, increased mirror size results in slower response time and higher power consumption. This problem can be solved by operating several small micro-mirrors in a synchronized way so that they perform as one large micro-mirror. The MEMS FT spectrometer does not need a photo detector array, which may be very expensive for the mid or far infrared region, while it provides a much higher scanning speed and a convenient way for background signal calibration in comparison with conventional FT spectrometer.

There are still other embodiments without deviating from the spirit of this invention. Any multi-element MEMS, aside from the above stated micro-mirror and micro-diffractive element types, may be used as the encoder (or modulator) inside the FT spectrometer, insofar as it can provide a dynamic variation of optical transmission, attenuation, reflection, or diffraction. Further, the encoding can be based on a dynamic variation of optical polarization and/or phase, in which case additional devices may be needed to convert a time varying optical polarization or phase variation into the required optical intensity variation. One example is the liquid crystal on silicon (LCOS) technology, where micro liquid crystal cells are attached in front of the micro-mirrors for polarization and/or phase modulation. Therefore, the present invention should be construed as limited only by the appended claims.

I claim:

1. A Fourier Transform (FT) spectrometer apparatus for performing FT spectrometry on a sample, the apparatus comprising:

a polychromatic light source for generating a light beam;

a dispersive element, disposed in a path of the light beam generated by the light source, for diffracting or refracting the light beam into spatially separated spectral components;

a multi-element MEMS (Micro-Electro-Mechanical-Systems) device, disposed in a path of the spatially separated spectral components, for encoding each of the spatially separated spectral components with different one of a plurality of modulation patterns to produce a plurality of encoded spectral components, said multi-element MEMS device comprising a plurality of micro-mirrors coated with liquid crystal materials or a plurality of deformable grating elements;

signal and reference beam forming elements, disposed in a path of the plurality of encoded spectral components, for forming the plurality of encoded spectral components into a probe beam and a reference beam and for directing the probe beam to the sample, the probe beam being absorbed or reflected by the sample to generate a signal beam;

a first photo detector, disposed in a path of the signal beam, for detecting the signal beam and outputting a first detected signal representing the signal beam;

a second photo detector, disposed in a path of the reference beam, for detecting the reference beam and outputting a second detected signal representing the reference beam; and a processor, in communication with the first and second photo detectors to receive the first and second detected signals, for resolving the first and second detected signals to resolve spectral components of the sample.

2. The FT spectrometer apparatus of claim 1, wherein the signal and reference beam forming elements comprise:

a beam combiner, disposed in a path of the plurality of encoded spectral components, for recombining the encoded spectral components to a single encoded light beam; and a beam splitter, disposed in a path of the single encoded light beam, for splitting the encoded light beam into a reference beam and a probe beam and for directing the probe beam to the sample.

3. The FT spectrometer apparatus of claim 1, further comprising one or more lenses for light beam manipulation.

4. The FT spectrometer apparatus of claim 1, wherein the dispersive element comprises a grating.

5. The FT spectrometer apparatus of claim 1, wherein the dispersive element comprises a prism.

6. The FT spectrometer apparatus of claim 1, wherein the MEMS device comprises a plurality of micro-mirrors.

7. The FT spectrometer apparatus of claim 6, wherein the micro-mirrors are tiltable.

8. The FT spectrometer apparatus of claim 6, wherein the micro-mirrors are deformable.

9. The FT spectrometer apparatus of claim 6, wherein the micro-mirrors are coated with a reflection material.

10. The FT spectrometer of claim 9, wherein said reflection material is selected from the group consisting of aluminum, silver, and gold.

11. The FT spectrometer apparatus of claim 1, wherein the MEMS device comprises a plurality of deformable grating elements.

12. The FT spectrometer apparatus of claim 1, wherein the MEMS device modulates an intensity of each of the spatially separated spectral components.

13. The FT spectrometer apparatus of claim 1, wherein the MEMS device modulates a phase of each of the spatially separated spectral components.

14. The FT spectrometer apparatus of claim 1, wherein the MEMS device modulates a polarization of each of the spatially separated spectral components.

15. The FT spectrometer apparatus of claim 1, wherein the plurality of modulation patterns differ in a frequency domain.

16. The FT spectrometer apparatus of claim 1, wherein the plurality of modulation patterns differ in a time domain.

17. The FT spectrometer apparatus of claim 1, wherein the plurality of modulation patterns differ in a phase domain.

18. The FT spectrometer apparatus of claim 1, wherein the plurality of modulation patterns differ in a code domain.

19. The FT spectrometer apparatus of claim 1, wherein the first and second photo detectors are single-element photo detectors.

20. The FT spectrometer apparatus of claim 1, wherein the processor ratios the first detected signal to the second detected signal for background calibration.

21. The FT spectrometer apparatus of claim 1, wherein the processor performs a Fourier transform on the first and second detected signals to resolve the spectral components of the sample.

22. The FT spectrometer apparatus of claim 1, wherein the processor performs synchronization and timing on the first and second detected signals to resolve the spectral components of the sample.

23. A Fourier Transform (FT) spectrometer apparatus for performing FT spectrometry on a sample, the apparatus comprising:
    a polychromatic light source for generating a light beam;
    a dispersive element, disposed in a path of the light beam generated by the light source, for diffracting or refracting the light beam into spatially separated spectral components;
    a multi-element MEMS (Micro-Electro-Mechanical-Systems) device, disposed in a path of the spatially separated spectral components, for encoding each of the spatially separated spectral components with different one of a plurality of modulation patterns to produce a plurality of encoded spectral components;
    signal and reference beam forming elements, disposed in a path of the plurality of encoded spectral components, for forming the plurality of encoded spectral components into a probe beam and a reference beam and for directing the probe beam to the sample, the probe beam being absorbed or reflected by the sample to generate a signal beam;
    a first photo detector, disposed in a path of the signal beam, for detecting the signal beam and outputting a first detected signal representing the signal beam;
    a second photo detector, disposed in a path of the reference beam for detecting the reference beam and outputting a second detected signal representing the reference beam; and
    a processor, in communication with the first and second photo detectors to receive the first and second detected signals, for resolving the first and second detected signals to resolve spectral components of the sample;
    wherein the processor performs heterodyne conversion on the first and second detected signals to resolve the spectral components of the sample.

24. A Fourier Transform (FT) spectrometer apparatus for performing FT spectrometry on a sample, the apparatus comprising:
    a polychromatic light source for generating a light beam;
    a dispersive element, disposed in a path of the light beam generated by the light source, for diffracting or refracting the light beam into spatially separated spectral components;
    a multi-element MEMS (Micro-Electro-Mechanical-Systems) device, disposed in a path of the spatially separated spectral components, for encoding each of the spatially separated spectral components with different one of a plurality of modulation patterns to produce a plurality of encoded spectral components;
    signal and reference beam forming elements, disposed in a path of the plurality of encoded spectral components, for forming the plurality of encoded spectral components into a probe beam and a reference beam and for directing the probe beam to the sample, the probe beam being absorbed or reflected by the sample to generate a signal beam;
    a first photo detector, disposed in a path of the signal beam, for detecting the signal beam and outputting a first detected signal representing the signal beam;
    a second photo detector, disposed in a path of the reference beam for detecting the reference beam and outputting a second detected signal representing the reference beam; and
    a processor, in communication with the first and second photo detectors to receive the first and second detected signals, for resolving the first and second detected signals to resolve spectral components of the sample;
    wherein the processor performs cross correlation on the first and second detected signals to resolve the spectral components of the sample.

25. A method for performing Fourier Transform (FT) spectrometry on a sample, the method comprising:
    (a) generating a light beam;
    (b) diffracting or refracting the light beam into spatially separated spectral components;

(c) using a multi-element MEMS (Micro-Electro-Mechanical-Systems) device to encode each of the spatially separated spectral components with different one of a plurality of modulation patterns to produce a plurality of encoded spectral components, said multi-element MEMS device comprising a plurality of micromirrors coated with liquid crystal materials or a plurality of deformable grating elements;

(d) recombining the encoded spectral components to a single encoded light beam;

(e) splitting the encoded light beam into a reference beam and a probe beam and directing the probe beam to the sample, the probe beam being absorbed or reflected by the sample to generate a signal beam;

(f) detecting the signal beam and outputting a first detected signal representing the signal beam;

(g) detecting the reference beam and outputting a second detected signal representing the reference beam; and (h) resolving the first and second detected signals to resolve spectral components of the sample and combining the spectral components to provide a spectrum of the sample.

26. The method of claim 25, wherein the light beam generated in step (a) is in the visible regime, and the method is used for visible spectrum analysis.

27. The method of claim 25, wherein the light beam generated in step (a) is in the ultraviolet regime, and the method is used for ultraviolet spectrum analysis.

28. The method of claim 25, wherein the light beam generated in step (a) is in the near infrared regime, and the method is used for near infrared spectrum analysis.

29. The method of claim 25, wherein the light beam generated in step (a) is in the mid and far infrared regime, and the method is used for mid and far infrared spectrum analysis.

* * * * *